United States Patent [19]

Morrill et al.

[11] Patent Number: 4,516,023
[45] Date of Patent: May 7, 1985

[54] SCANNER/PLOTTER OPTICAL SYSTEM

[75] Inventors: David R. Morrill, Salisbury; Mark T. Mason, Somerville; Paul M. Green, Lowell, all of Mass.

[73] Assignee: Klimsch/Optronics, Chelmsford, Mass.

[21] Appl. No.: 384,610

[22] Filed: Jun. 3, 1982

[51] Int. Cl.³ .............................................. H01J 5/16
[52] U.S. Cl. ................................. 250/235; 350/6.6
[58] Field of Search ............. 358/293, 294, 285, 296; 250/234, 235, 236; 350/6.1, 6.2, 6.6, 6.8

[56] References Cited

U.S. PATENT DOCUMENTS

4,352,984  10/1982  Ohara ..................................... 250/234
4,408,826  10/1983  Ike ......................................... 250/236

*Primary Examiner*—David C. Nelms
*Assistant Examiner*—J. Jon Brophy
*Attorney, Agent, or Firm*—Thompson, Birch, Gauthier & Samuels

[57] ABSTRACT

A laser beam scanner with encoder and a laser beam plotter with encoder are disclosed. The scanner provides for unsharp masking by alternating between a large scan beam and a small scan beam on alternate scans. Compensation for non-straight scan lines is achieved through a small linear galvonometer placed in the scanning optics. An equal conjugate optical system is utilized to allow encoder information to be obtained from a stationary image of the main scanning and plotting galvonometer mirror.

9 Claims, 12 Drawing Figures

SCANNER/PLOTTER OPTICAL SYSTEM

BACKGROUND OF THE INVENTION

The present invention relates to scanners and plotters in general, and more particularly, to a laser beam scanner/plotter optical system.

Laser beam scanners and photoplotters are well known in the graphics industry. Such scanner and plotters can be classified in at least two categories: drum and flatbed scanners. As the size of the scanned original and the plotted film input increases, there is a concomittant increase in the requirements for physical and optical accuracy. These accuracies can be achieved to some measure, albeit often at the expense of physical size for the optics and the moving bed in a flatbed scanner.

It is accordingly a general object of the invention to provide an improved scanner/plotter.

It is a specific object of the present invention to provide a scanner/plotter optical system having a relatively small physical profile.

It is another object of the invention to provide a scanner optical system that utilizes unsharp masking.

It is still another object of the invention to provide a scanner that compensates for unstraight scan lines.

It is a further object of the invention to provide an encoder for scanner/plotter optical systems that utilizes equal conjugates.

It is a still further object of the invention to provide an encoder for scanner/plotter optical systems in which encoder information is derived from a stationary image of the main galvonometer mirror.

It is a feature of the invention that the scanner/plotter optical system can be constructed from conventional optical elements.

It is another feature of the invention that the optical elements of the scanner/plotter optical system are arranged in a physically compact configuration.

It is a further feature of the invention that the encoder grating can be placed optically in the same plane as the scan/plotting plane.

DETAILED DESCRIPTION OF A PREFERRED EMBODIMENT

Turning now to the drawings, there is shown in diagrammatic form the optical system of a scanner/plotter indicated generally by the reference numeral 10. In order to best understand the optical system of the scanner/plotter 10 which performs both scanning and plotting as well as encoding, it will be helpful to discuss each of these functions separately. FIGS. 1 through 4 illustrate the optical system of the scanner while FIGS. 5 through 8 depict the encoder function of the scanner/plotter 10 and FIGS. 9 through 12 show the plotter function.

Referring now to FIGS. 1 through 4, illumination for the scanning function is provided by a helium neon laser 12 having 7 mw of power. The light from laser 12 is directed off the axis of the laser by means of first-surface mirrors 14 and 16. After reflection from mirror 16, the laser light is split by a beam splitter 18 into an encoder beam 20 and a scan beam 22. The encoder and scan beams 20 and 22, respectively, are ultimately recombined within the optical cavity 23 of the scanner/plotter as will be described below. However, for the moment, we will describe the optical path only of the scan beam 22.

After exiting from the beam splitter 18, the scan beam 22 strikes front-surface mirrors 24 and 26. These mirrors are employed merely to direct the laser light along the desired paths. After reflection from mirror 26, the scan beam strikes a beam chopper 28. The beam chopper comprises a disk made of borescilate crown glass that is divided into four sectors of 90 degrees each. Two of these 90 degree sectors, exactly opposed, are aluminized to be fully reflective, while the other two sectors, also exactly 180 degrees apart, are transparent so that the light will be transmitted through the beam chopper virtually unchanged.

The chopper disk 28 is synchronized to the scan of a main galvonometer mirror 30 so that the clear sector will be in the scan beam for exactly as long as it takes the galvonometer mirror 30 to make one trace and the mirror sector will be in the beam for exactly as long as it takes the galvonometer mirror to make a single retrace. In this manner, one can pass the trace beam through and reflect the retrace beam, thereby effectively splitting the scan beam into two separate paths, one for trace and one for retrace. The trace beam constitutes a "sharp" transmitted beam while the retrace beam constitutes an "unsharp" reflected beam.

The "sharp" beam or transmitted beam, after passing through the chopper disk 28, strikes a small linear galvonometer mirror 32 that is used to provide a scan line straightening correction. The light is reflected 90 degrees at the linear galvonometer mirror 32 and almost immediately strikes a rear lens 34 of a thirty-eight power (38X) beam expander comprising rear lens 34 and front lens 48. After transmission through the rear lens of the beam expander, the light strikes a set 36 of optical wedges. The wedges are used to change the optical path length in the beam expander. By varying the optical path length, one can vary the diameter of the scan beam striking the scan copy by adjusting the amount of glass the light travels through in the wedge set.

The "unsharp" beam or the beam reflected from the chopper disk 28 passes through a half-wave retardation plate 32 which rotates the axis of polarization of the scan laser beam by exactly 90 degrees. At this point, there are two beams: a transmitted beam that is polarized in a vertical plane and a reflected beam that is polarized in a horizontal plane.

The reflected or "unsharp" beam now strikes a small linear galvonometer mirror 40 and is reflected to another rear lens 42 of the beam expander and then through another set 44 of optical wedges in the same manner as the transmitted or "sharp beam". Given this optical configuration, one can appreciate the apparatus has the capability of correcting not only for scan line straightness, but also for adjusting the size of either the "sharp" or "unsharp" beam.

Figure 1:
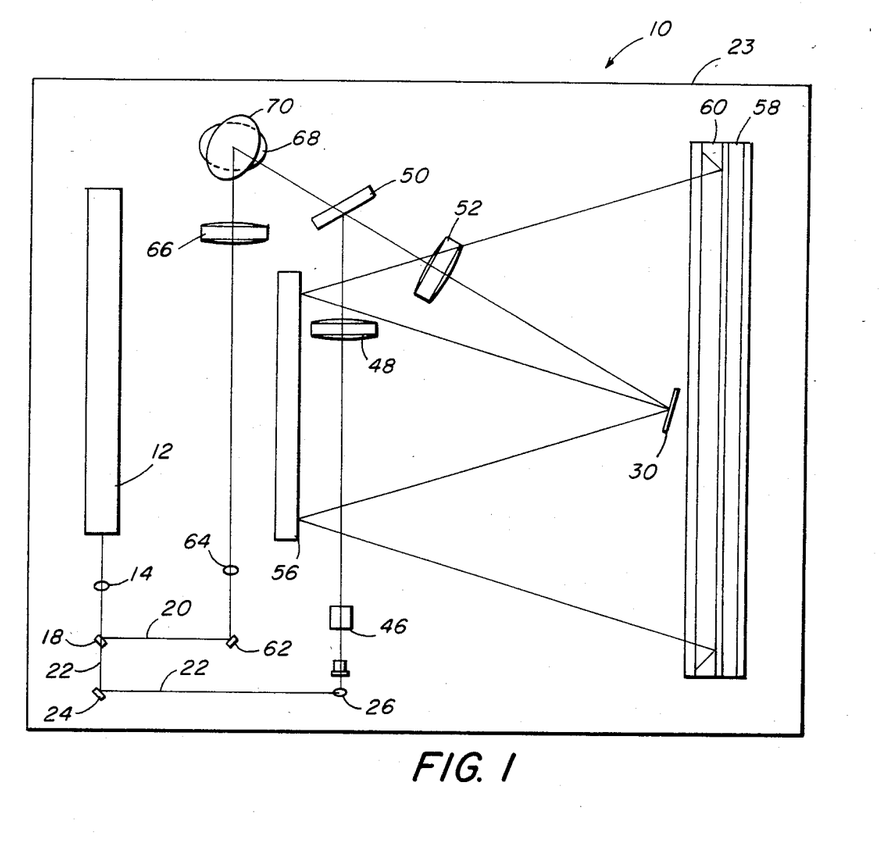
FIG. 1 is a plan view of the optical components and optical paths of the scanner and encoder portions of the scanner/plotter.
Figure 2:
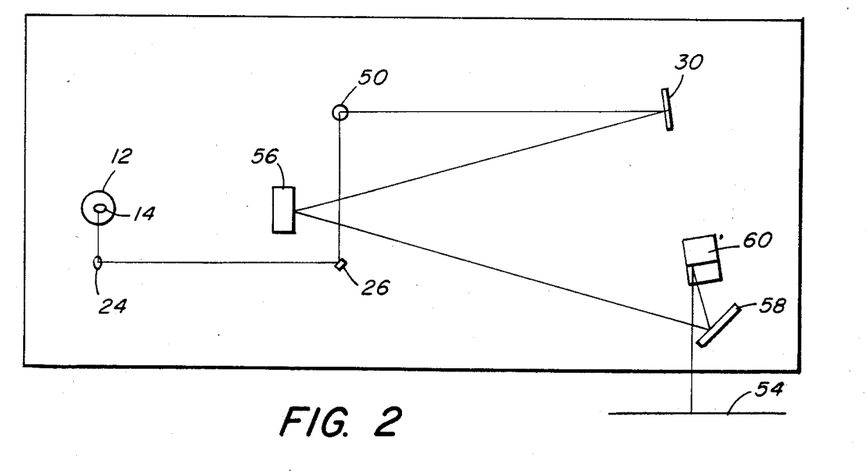
FIG. 2 is a view in side elevation of the apparatus of FIG. 1.
Figure 3:
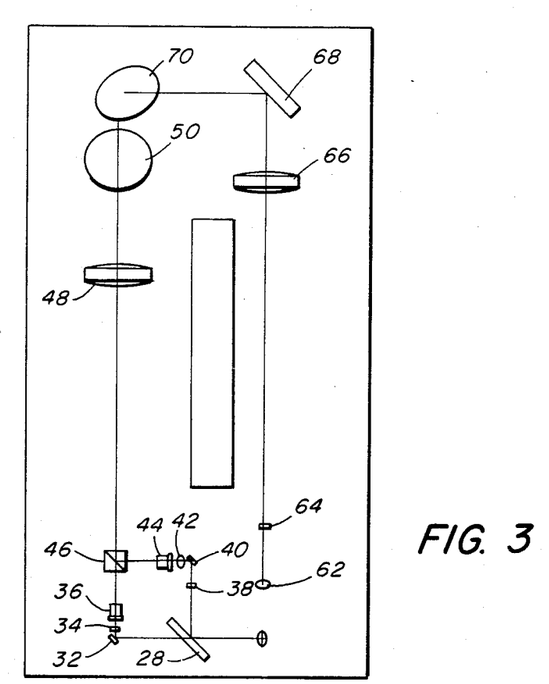
FIG. 3 is a front view of the apparatus of FIG. 1.
Figure 4:
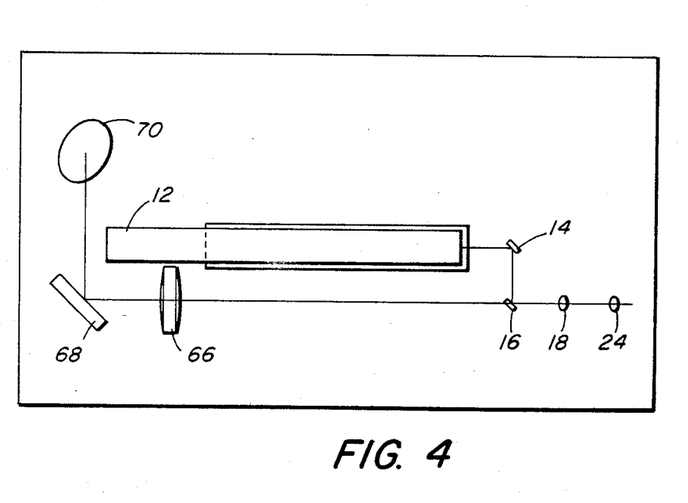
FIG. 4 is a rear view of the apparatus of FIG. 1.
Figure 5:
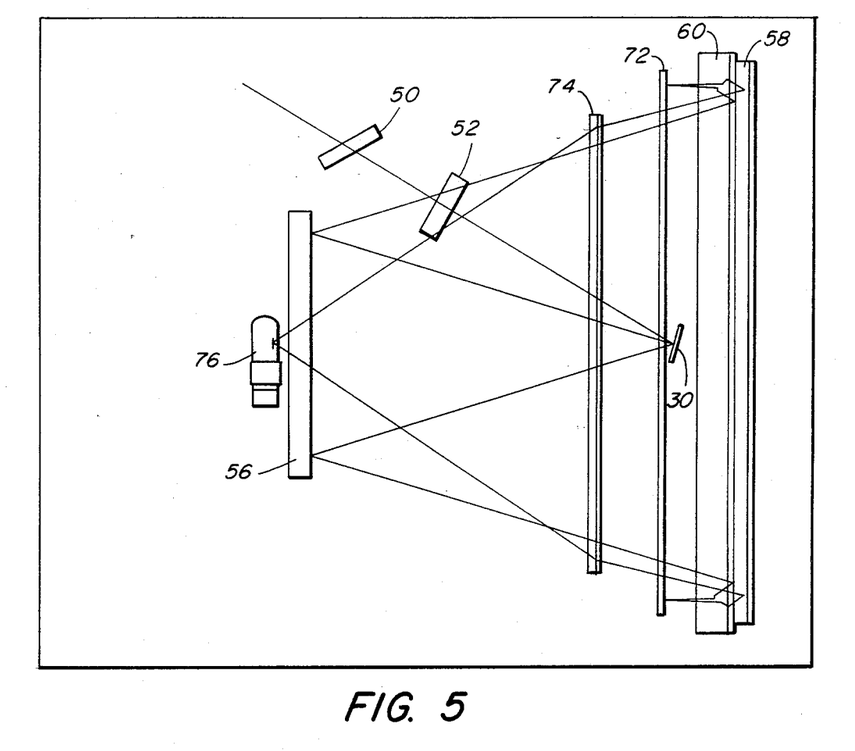
FIG. 5 is a plan view similar to that of FIG. 1 showing the specific optical components and optical path of the encoder portion of the scanner/plotter.
Figure 6:
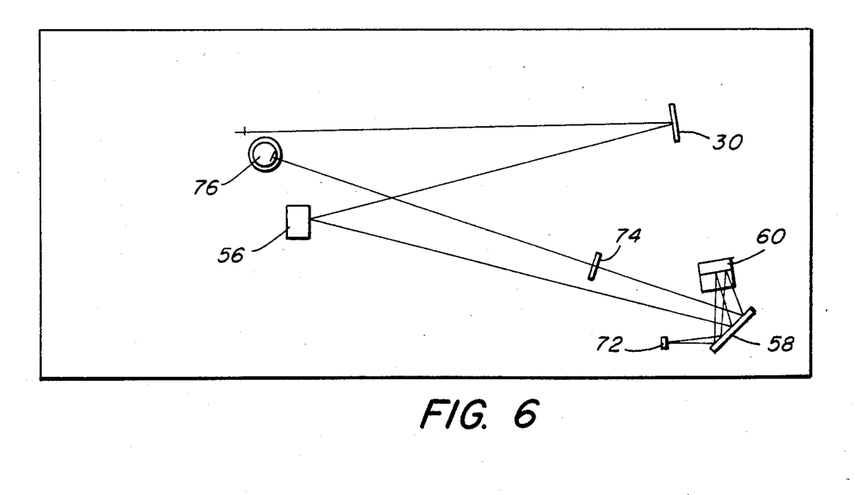
FIG. 6 is a view in side elevation of the apparatus of FIG. 5.

Both beams strike surfaces of a polarizing beam splitter 46. The polarizing beam splitter 46 has the property of transmitting vertically polarized light directly through the splitter as illustrated in FIG. 3. The vertically polarized light beam is the "sharp" beam that is transmitted through the beam choppper disk 28. The polarizing beam splitter 46 also reflects almost 100 percent of the light that is horizontally polarized as is the light that is reflected off of the beam chopper disk 28. Thus, by adjusting the mirrored surfaces of the linear galvonometers 32 and 40, one can make both of the beams exactly coaxial as they exit from the polarizing beam splitter cube 46.

From here the scan light beam passes through the beam expander primary lens 48. The input beam is nominally 1 mm while the output beam is nominally 38 mm in diameter. After exiting from the primary lens 48 of the beam expander, the scan beam is reflected from the front surface of a beam combiner 50 that combines both the encoder beam 20 and the scan beam 22 as will be described below.

After reflection from beam combiner 50, the scan beam passes through a main system objective lens 52 and then strikes the previously mentioned main resonant galvonometer mirror 30. The galvonometer mirror 30 is driven by a resonant galvonometer (not shown) that oscillates mirror 30 through an arc to produce a scan beam arc of 28 degrees. The scan beam strikes a field fold mirror 56 and then travels through and is reflected from a final fold mirror 58 to a field flattener 60. From the field flattener 60 the scan beam is brought to a focus at a scan/plotting plane 54 located exactly 1.5 meters from the main objective lens 52.

Having described the optical path of the scanner, we will now discuss the optical path for the encoder beam. Referring still to FIGS. 1 through 4, the encoder beam 20 is reflected from a mirror 62 through the rear and front lenses 64 and 66, respectively, of a thirty-eight power (38X) beam expander. After exiting from the beam expander front lens 66, the encoder beam is reflected off of corner mirrors 68 and 70 to the rear surface of the previously mentioned beam combiner 50.

Ideally one would like to have the encoder beam and the scanning or plotting laser beam exactly overlaid. However, if the beams are exactly overlaid, there is no convenient way to separate them further along the optical path. In order to solve this problem, the scan or plotting laser beam 22 is reflected off the front surface of the beam combiner 50 while the encoder beam 22 is transmitted through the beam combiner 50. Thus, the two beams are skewed to each other, i.e. they are at a slight angle to each other, but the angle converges so that the beams are exactly overlaid or congruant at the galvonometer mirror 30.

The galvonometer mirror 30 moves through a 14.28 degree angular subtense. Because of the optical doubling, this means that the beam moves through a 28.56 degree subtense. This angular arc is sufficient to give a scan of 587.6 mm at the film or scan plane 54.

Referring now to FIGS. 5 through 8, the scan or plotting beam 22 and the encoder beam 20 travel from the galvonometer 30 to the previously mentioned field fold mirror 56. The field fold mirror is positioned so that a beam of light striking it is still in the range of 25 mm in diameter. In order to prevent optical distortion in the system, the field fold mirror should be very flat, i.e. in the order of $\frac{1}{8}$ of a wavelength of green light.

From the field fold mirror 56, the two light beams are reflected to the final fold mirror 58. At this mirror, the two beams are separated or displaced because of their now slightly angular divergence. The relationship of the two beams can best be seen in the enlarged detail drawing of FIG. 7.

Figure 7:
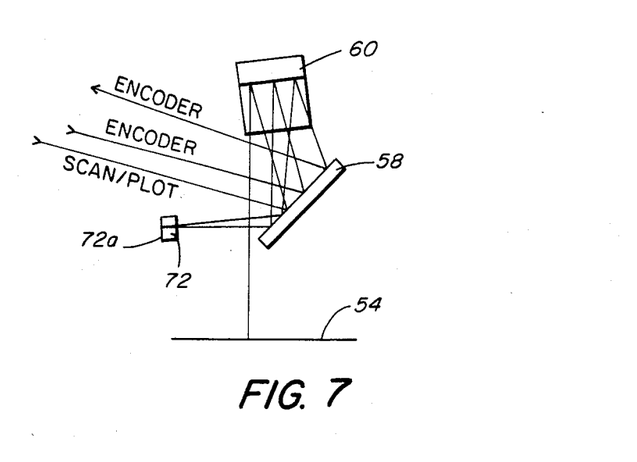
FIG. 7 is an enlarged view in side elevation showing the optical paths of the scan/plot beam and the encoder beam with respect to a final fold mirror, a field flattening mirror and an encoder.
Figure 8:
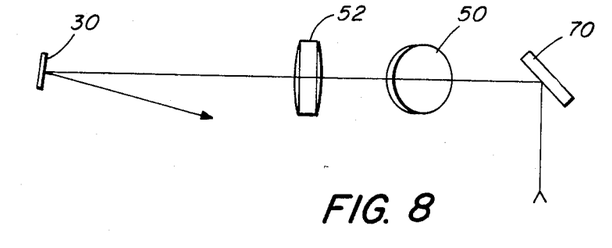
FIG. 8 is a view in side elevation looking toward the apparatus of FIG. 5 from a point beyond the upper right hand corner of the apparatus shown in FIG. 5.
Figure 9:
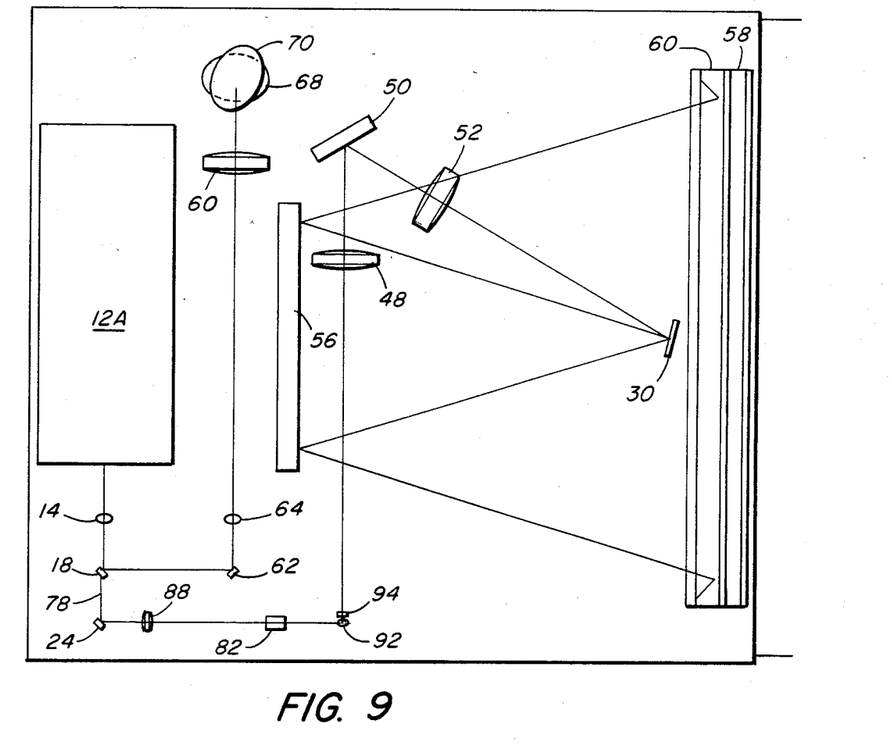
FIG. 9 is a plan view of the optical components and optical paths of the plotter and encoder portions of the scanner/plotter.
Figure 10:
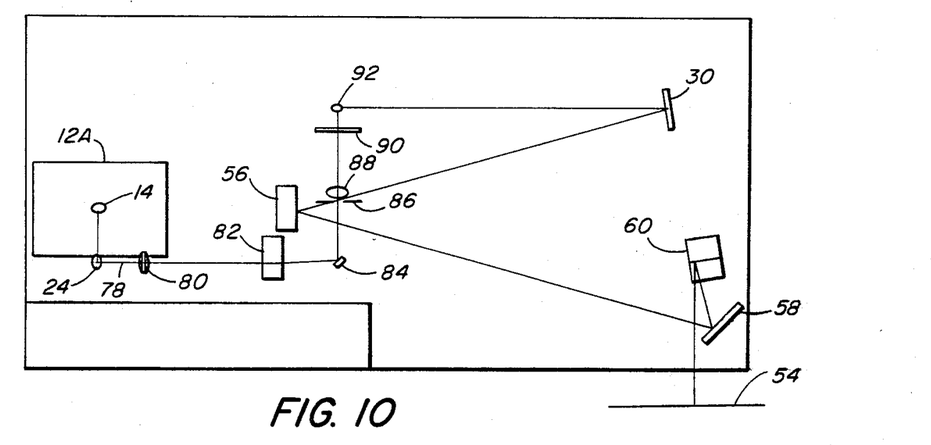
FIG. 10 is a view in side elevation of the apparatus of FIG. 9.
Figure 11:
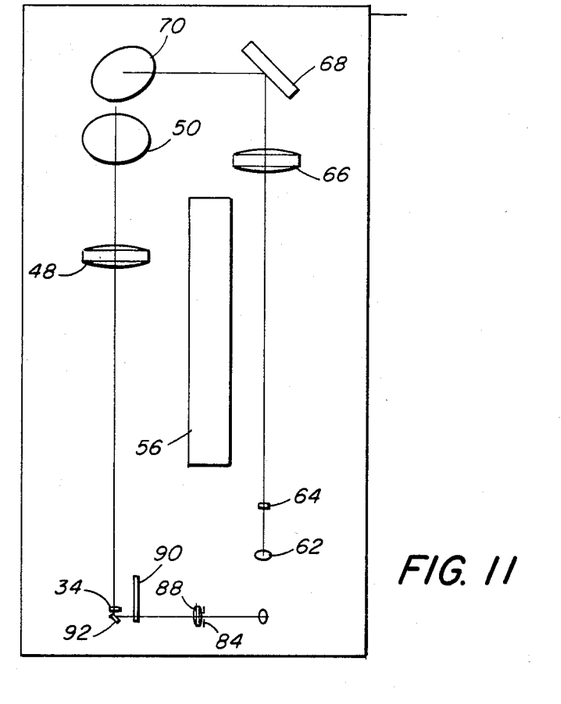
FIG. 11 is a front view of the apparatus of FIG. 9.
Figure 12:
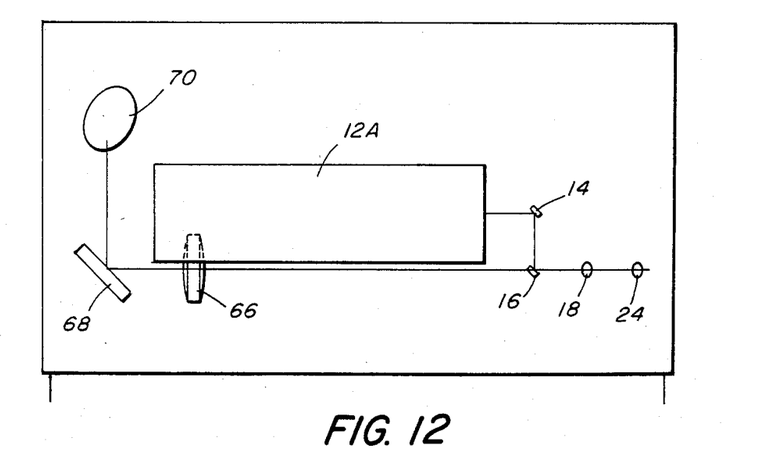
FIG. 12 is a rear view of the apparatus of FIG. 9.

The scan or plotting beam 22 is reflected from the final fold mirror 58 to the field flattening mirror 60. From the field flattening mirror the beam is reflected down missing the final fold mirror 58 and striking the scan or film plotting plane 54. This plane is exactly 1500 mm or 1.5 meters from the main system objective lens 52. The encoder beam 20 is also reflected from the final fold mirror 58 to the field flattening mirror 60 because of the angular divergence and displacement of the two beams but it returns once again to the final fold mirror 58 and from there it focuses on the rear surface of an encoder 72.

The encoder 72 has a rear surface that is reflective and is aluminized with black lines deposited in a regularly spaced fashion to form an encoder grating 72A that is located exactly 1.5 meters from the main system objective lens 52 so that the encoder grating and the scan or plotting plane 54 are at an identical focus.

The rear surface of the encoder is used as the reflecting surface for the encoder grating instead of the front surface because it allows the front surface of the encoder to be slightly out of focus in the encoder beam. The encoder glass is approximately 1 cm thick. The beam is larger than a nominal 30 microns in diameter at the front surface of the encoder thereby decreasing the sensitivity to dust or dirt that might collect on the front face of the encoder. Since the encoder grating is protected on the rear surface, cleaning is only required on the front surface of the encoder glass.

From the encoder grating, the encoder beam light is reflected back to the final fold mirror 58 out to the field flattening mirror 60, back down to the final fold mirror 58 and from there into space within the scanner/plotter unit. It should be explained at this point why this particular optical path has been employed. If one uses an optical system that is operating at equal conjugates, i.e., the object and the image are exactly the same distance from the optical elements, then the image exactly duplicates the object in space. In the scanner/plotter, the object is the face of the galvonometer mirror 30 which constitutes the system field stop. Since the system has identical optical paths from the galvonometer mirror 30 to the encoder grating 72A and from the encoder grating back up into space, a stationary image of the galvonometer mirror face 30 will be formed in space.

This particular optical configuration is used because the encoder grating 72A is approximately 600 mm long and it is difficult to implement a linear detector that is sensitive enough to detect a signal over a length of 600 mm. By employing auto-collimation or equal conjugates, it is possible to use a detector that only has to be sensitive over a much smaller area e.g., approximately 35 mm rather than over a 600 mm length.

Since the system operates at exactly equal conjugates, the distance from the galvonometer mirror 30 to the scan/film plane 54 is exactly equal to the distance from the encoder grating 72A to a suitable photodetector (not shown). This distance is 1,020 mm. If the distance of 1,020 mm is preserved, the photodetector would have to be located outside of the optical cavity 23 and the physical configuration of the scanner/plotter would be unduly large. In order to reduce the physical path length, a fresnel lens 74 is included in the optical path between the final fold mirror 58 and a photodetector 76. The fresnel lens shortens the encoder-to-image distance to approximately 589 mm. This distance permits placing the photodetector at a location inside the optical cavity 23.

The photomultiplier tube 76 produces an output signal that is a replica in time of the focused laser spot passing over the alternate silver and black lines of the encoder grating 72A. The resulting signal is modulated from maximum intensity to zero at a rate that is a function of the number of lines per millimeter on the encoder grating 72A and the scan velocity of the galvonometer mirror 30. Use of this signal to produce a time advanced train of clock signals is described in the application of Andrew Warner for Method and Apparatus for Producing A Time Advanced Output Pulse Train From An Input Pulse Train, filed June 3, 1982 as Ser. No. 384,476 and owned by the same owner as this application.

Having described in detail the scanner and encoding portion of the scanner/plotter, we will now discuss the plotter portion with respect to FIGS. 9 through 12. Since many of the components of the plotter shown in FIGS. 9 through 12 are the same optical elements as previously described in connection with the scanner and encoder optical paths, the same reference numerals are used in these Figures for the same optical elements.

For plotting purposes, a different and more powerful laser 12A is used as the light source. Laser 12A is an argon laser having a wavelength of 488 nanometers with a beam power of approximately 25 mw at this wavelength. The light from laser 12A strikes beam splitter 18 after two directional changes produced by reflections from mirrors 14 and 16. Beam splitter 18 divides the light into the previously mentioned encoder beam 20 and a plotting beam 78. Since the encoder beam optical path has been previously described, it will not be repeated.

The plotting beam 78 is redirected by the first surface mirror 24 to a lens 80 with a focal length of 140 mm. Lens 80 operates as a pre-focus lens that tailors the plotting beam light so that it will be utilized best by an acousto-optic modulator 82. The purpose for using the pre-focus lens 80 is to reduce the diameter of the plotting laser beam to a minimum at the center of the acousto-optic crystal in modulator 82, thereby producing a faster rise time.

After passing through the acousto-optic modulator, the plotting beam is reflected by mirror 84 and passes through an aperture plate 86 that separates out the unwanted orders that are produced by the acousto-optic modulator. After exiting from the aperture plate, the light beam passes through another lens 88 that is identical in all characteristics to the pre-focus lens 80. Lens 88 returns the light beam to its nominal 1 mm diameter.

The plotting beam is then directed through a neutral density wheel 90 that is controlled by a stepper motor (not shown) and ultimately by computer software. The neutral density wheel 90 is used for exposure setting so that the amount of light striking the film at film plane 54 can be varied by rotating the neutral density wheel 90 to insert the desired amount of neutral density in the plotting beam optical path.

After passing through the neutral density wheel 90, the plotting beam is reflected off of a mirror 92 and then passes through the secondary lens 94 of a beam expander comprising secondary lens 94 and the previously mentioned primary beam expander lens 48. From this point on, the optical path of the plotting beam to the film plane 54 is identical to the scanner path described previously.

Having described in detail a preferred embodiment of our scanner with encoder and our plotter with encoder, it will now be apparent to those skilled in the art that numerous modifications can be made therein without departing from the scope of the invention as defined in the following claims. Specifically, those skilled in the art will appreciate that the dimensions, optical powers, wavelengths and the like referred to herein are merely illustrative and should not be construed as limiting our invention.

What we claim and desire to secure by Letters Patent of the United States is:

1. A laser beam scanner comprising:
(1) laser light beam generating means;
(2) means for splitting the laser light beam into an encoder beam and a scan beam
(3) means including an oscillating mirror for: scanning the scan beam back and forth across a scan plane: and, scanning the encoder beam back and forth across an encoder grating comprising alternating laser light reflecting and absorbing elements;
(4) means for forming an image of the face of said oscillating mirror; and,
(5) photodetector means located at and being responsive to the image of said oscillating mirror face.

2. The laser beam scanner of claim 1 wherein the optical distance from the oscillating mirror to the scan plane is equal to the optical distance from the encoder grating to the image of the oscillating mirror face.

3. The laser beam scanner of claim 2 wherein said encoder and scan beams are convergingly incident to and are only congruent at said oscillating mirror.

4. The laser beam scanner of claim 1 wherein said encoder grating is planar and the plane of said grating is located optically at the scan plane.

5. The laser beam scanner of claim 1 further comprising a mirror means located in the optical path of said scan beam for changing the scan direction as the scan beam scans across the scan plane.

6. A laser beam plotter comprising:
(1) laser light beam generating means;
(2) means for splitting the laser light beam into an encoder beam and a plotter beam
(3) means including an oscillating mirror for: scanning the plotter beam back and forth across a plotting plane; and, scanning the encoder beam back and forth across an encoder grating comprising alternating laser light reflecting and absorbing elements;

(4) means for forming an image of the face of said oscillating mirror; and, (5) photodetector means located at and being responsive to the image of said oscillating mirror face.

7. The laser beam plotter of claim 6 wherein the optical distance from the oscillating mirror to the plotting plane is equal to the optical distance from the encoder grating to the image of the oscillating mirror face.

8. The laser beam plotter of claim 6 wherein said encoder and plotter beams are convergingly incident to and are only congruent at said oscillating mirror.

9. The laser beam plotter of claim 6 wherein said encoder grating is planar and the plane of said grating is located optically at the plotting plane.

* * * * *